US009582110B2

(12) United States Patent
Zhan et al.

(10) Patent No.: US 9,582,110 B2
(45) Date of Patent: Feb. 28, 2017

(54) DISPLAY PANEL AND METHOD OF REPAIRING THE SAME

(71) Applicant: SHENZHEN CHINA STAR OPTOELECTRONICS TECHNOLOGY CO., LTD., Shenzhen, Guangdong (CN)

(72) Inventors: Wei Zhan, Guangdong (CN); Zhiyuan Shen, Guangdong (CN); Haibo Du, Guangdong (CN)

(73) Assignee: SHENZHEN CHINA STAR OPTOELECTRONICS TECHNOLOGY CO., LTD., Shenzhen, Guangdong (CN)

( * ) Notice: Subject to any disclaimer, the term of this patent is extended or adjusted under 35 U.S.C. 154(b) by 73 days.

(21) Appl. No.: 14/416,564

(22) PCT Filed: Dec. 18, 2014

(86) PCT No.: PCT/CN2014/094160
§ 371 (c)(1),
(2) Date: Jan. 22, 2015

(87) PCT Pub. No.: WO2016/090666
PCT Pub. Date: Jun. 16, 2016

(65) Prior Publication Data
US 2016/0170560 A1    Jun. 16, 2016

(30) Foreign Application Priority Data
Dec. 12, 2014 (CN) .......................... 2014 1 0766751

(51) Int. Cl.
*G06F 3/045* (2006.01)
*G06F 3/041* (2006.01)
*G06F 3/044* (2006.01)

(52) U.S. Cl.
CPC ............ *G06F 3/0418* (2013.01); *G06F 3/044* (2013.01); *G06F 3/0412* (2013.01); *G06F 3/0416* (2013.01)

(58) Field of Classification Search
CPC ...... G06F 3/0412; G06F 3/0418; G06F 3/044; G06F 2203/04112; G06F 2203/04103
USPC .................................................. 345/173–179
See application file for complete search history.

(56) References Cited

U.S. PATENT DOCUMENTS

| 8,823,683 | B2 * | 9/2014 | Chung | G06F 3/0412 178/18.09 |
| 2012/0229395 | A1 * | 9/2012 | Shin | G06F 3/0418 345/173 |
| 2013/0155024 | A1 * | 6/2013 | Chung | G06F 3/0412 345/175 |

* cited by examiner

*Primary Examiner* — Vijay Shankar
(74) *Attorney, Agent, or Firm* — Kirton McConkie; Evan R. Witt

(57) ABSTRACT

A display panel and a method of repairing the same are disclosed. The display panel includes a pixel array substrate, a signal processor and a touch-sensing layer. The touch-sensing layer is connected to the signal processor and includes touch-sensing electrodes, primary leads and spare leads. Each primary lead is used to receive a touch-sensing signal and transmit the touch-sensing signal to the signal processor; and each spare lead is used to replace the corresponding primary lead when a disconnection defect occurs in the corresponding primary lead as so to receive the touch-sensing signal instead. Defect rate of the display panel can be lowered.

12 Claims, 7 Drawing Sheets

DISPLAY PANEL AND METHOD OF REPAIRING THE SAME

BACKGROUND OF THE INVENTION

Field of the Invention

The present invention relates to the field of display technology, and more particularly to a display panel and a method of repairing the same.

Description of the Related Art

Conventional display panels are usually integrated with a touch-sensing-electrode layer so as to achieve a touch-sensing function.

The touch-sensing-electrode layer is generally formed in the display panel during the manufacturing process of the display panel.

However, during the process of forming the touch-sensing-electrode layer, the conductive wires for transmitting touch-sensing signals sometimes may have a disconnection defect that causes a corresponding touch-sensing area to malfunction, even further causing the display panel to be discarded.

Therefore, it is necessary to provide a new technical solution to overcome the problems existing in the conventional technology.

SUMMARY OF THE INVENTION

An object of the present invention is to provide a display panel and a method of repairing the same to achieve repairing the display panel when the display panel has a disconnection defect so as to lower the defect rate of the display panel.

In order to solve the foregoing technical problem, the technical solution of the present invention is as follows:

A display panel including: a pixel array substrate; a signal processor; a touch-sensing layer mounted in the pixel array substrate and connected with the signal processor, wherein the touch-sensing layer includes: a sensing-electrode layer having: a sensing electrode array having at least two sensing electrodes which are arranged in an array manner; a lead layer having at least two lead sets, each of which includes: a primary lead being connected with the corresponding sensing electrode and the signal processor and being used to receive a touch-sensing signal generated by the corresponding sensing electrode and transmit the touch-sensing signal to the signal processor; and a spare lead being used to replace the primary lead when a disconnection defect occurs in the primary lead so as to receive the touch-sensing signal instead, and being used to further establish a connection with the corresponding sensing electrode and the signal processor when the disconnection defect occurs in the primary lead so as to transmit the touch-sensing signal to the signal processor; wherein the primary lead and the spare lead belonging to the same lead set are electrically insulated from each other; and an insulated layer being mounted on the lead layer, wherein the sensing-electrode layer is mounted on the insulated layer.

In one embodiment of the display panel, the sensing electrode array includes at least two sensing-electrode rows; the sensing-electrode layer further includes at least one repairing wire, wherein a line along which the repairing wire is arranged is parallel with a line along which the sensing-electrode row is arranged; the primary lead is used to establish a connection with the repairing wire when the disconnection defect occurs in the primary lead; the spare lead is used to establish a connection with the repairing wire when the disconnection defect occurs in the primary lead so that the received touch-sensing signal is transmitted to the signal processor via the spare lead, the repairing wire and the primary lead.

In one embodiment of the display panel, the primary lead includes a first section and a second section; the first section is connected to the corresponding sensing electrode via a through hole; the second section is connected to the signal processor; the repairing wire includes a third section, a fourth section and a fifth section; the repairing wire is further used to break a connection between the third section and the fourth section and a connection between the fourth section and the fifth section when the disconnection defect occurs in the first section of the primary lead; the second section of the primary lead is further used to establish a connection with the fourth section of the repairing wire when the disconnection defect occurs in the first section of the primary lead; and the spare lead is further used to establish a connection with the corresponding sensing electrode and the fourth section of the repairing wire when the disconnection defect occurs in the first section of the primary lead.

In one embodiment of the display panel, the connection between the first section and the second section of the primary lead is broken by laser cutting; the connection between the third section and the fourth section of the repairing wire is broken by laser cutting; the connection between the fourth section and the fifth section of the repairing wire is broken by laser cutting; the connection between the spare lead and the corresponding sensing electrode is established by soldering; the connection between the spare lead and the fourth section of the repairing wire is established by soldering; and the connection between the second section of the primary lead and the fourth section of the repairing wire is established by soldering.

A display panel including: a pixel array substrate; a signal processor; and a touch-sensing layer mounted in the pixel array substrate and connected with the signal processor, wherein the touch-sensing layer includes: a sensing-electrode layer having: a sensing electrode array having at least two sensing electrodes which are arranged in an array manner; and a lead layer having a lead-set array consisting of at least two lead sets, wherein each of the lead sets includes: a primary lead being connected with the corresponding sensing electrode and the signal processor and being used to receive a touch-sensing signal generated by the corresponding sensing electrode and transmit the touch-sensing signal to the signal processor; and a spare lead being used to replace the primary lead when a disconnection defect occurs in the primary lead so as to receive the touch-sensing signal instead.

In one embodiment of the display panel, the spare lead is used to establish a connection with the corresponding sensing electrode and the signal processor when the disconnection defect occurs in the primary lead so as to transmit the touch-sensing signal to the signal processor.

In one embodiment of the display panel, the sensing electrode array includes at least two sensing-electrode rows; the sensing-electrode layer further includes at least one repairing wire, wherein a line along which the repairing wire is arranged is parallel with a line along which the sensing-electrode row is arranged; the primary lead is used to establish a connection with the repairing wire when the disconnection defect occurs in the primary lead; the spare lead is used to establish a connection with the repairing wire when the disconnection defect occurs in the primary lead so that the received touch-sensing signal is transmitted to the signal processor via the spare lead, the repairing wire and the primary lead.

In one embodiment of the display panel, the repairing wire is mounted at one side of the lead-set array.

In one embodiment of the display panel, the repairing wire is mounted on a position corresponding to a gap between two adjacent sensing-electrode rows.

In one embodiment of the display panel, the primary lead includes a first section and a second section; the first section is connected to the corresponding sensing electrode via a through hole; and the second section is connected to the signal processor; the repairing wire includes a third section, a fourth section and a fifth section, the repairing wire is further used to break a connection between the third section and the fourth section and a connection between the fourth section and the fifth section when the disconnection defect occurs in the first section of the primary lead; the second section of the primary lead is further used to establish a connection with the fourth section of the repairing wire when the disconnection defect occurs in the first section of the primary lead; and the spare lead is further used to establish a connection with the corresponding sensing electrode and the fourth section of the repairing wire when the disconnection defect occurs in the first section of the primary lead.

In one embodiment of the display panel, the connection between the third section and the fourth section of the repairing wire is broken by laser cutting; the connection between the fourth section and the fifth section of the repairing wire is broken by laser cutting; the connection between the spare lead and the corresponding sensing electrode is established by soldering; the connection between the spare lead and the fourth section of the repairing wire is established by soldering; and the connection between the second section of the primary lead and the fourth section of the repairing wire is established by soldering.

In one embodiment of the display panel, the connection between the first section and the second section of the primary lead is broken by laser cutting.

In one embodiment of the display panel, the touch-sensing layer further includes an insulated layer being mounted on the lead layer; and the sensing-electrode layer is mounted on the insulated layer.

In one embodiment of the display panel, the spare lead is connected to the corresponding sensing electrode by passing through the insulated layer.

In one embodiment of the display panel, the primary lead and the spare lead belonging to the same lead set are electrically insulated from each other.

A method of repairing the foregoing display panel, wherein the method comprises the following steps: A. establishing a connection between the spare lead and the sensing electrode; B. establishing a connection between the spare lead and the repairing wire; and C. establishing a connection between the primary lead and the repairing wire.

In one embodiment of the method of repairing the foregoing display panel, the method further comprises the following steps: D. breaking the connection between the third section of the repairing wire and the fourth section of the repairing wire; and E. breaking the connection between the fourth section of the repairing wire and the fifth section of the repairing wire.

In one embodiment of the method of repairing the foregoing display panel, the step A further includes: a1. connecting the spare lead and the corresponding sensing electrode by soldering; the step B further includes: b1. connecting the spare lead and the fourth section of the repairing wire by soldering; and the step C further includes: c1. connecting the second section of the primary lead and the fourth section of the repairing wire by soldering.

In one embodiment of the method of repairing the foregoing display panel, the method further comprises the following steps: F. breaking the connection between the first section and the second section of the primary lead.

In one embodiment of the method of repairing the foregoing display panel, the step F further includes: f1. breaking the connection between the first section and the second section of the primary lead by laser cutting.

Compared with conventional technologies, the present invention is able to achieve repairing display panels when they have disconnection defects, thereby lowering the defect rate of display panels.

In order to make the contents of the present invention more easily understood, the preferred embodiments of the present invention are described in detail, in cooperation with accompanying drawings, as follows:

DETAILED DESCRIPTION OF THE PREFERRED EMBODIMENTS

As used herein, the singular forms "a" and "an" are intended to include the plural forms as well, unless the context clearly indicates otherwise.

Figure 1:
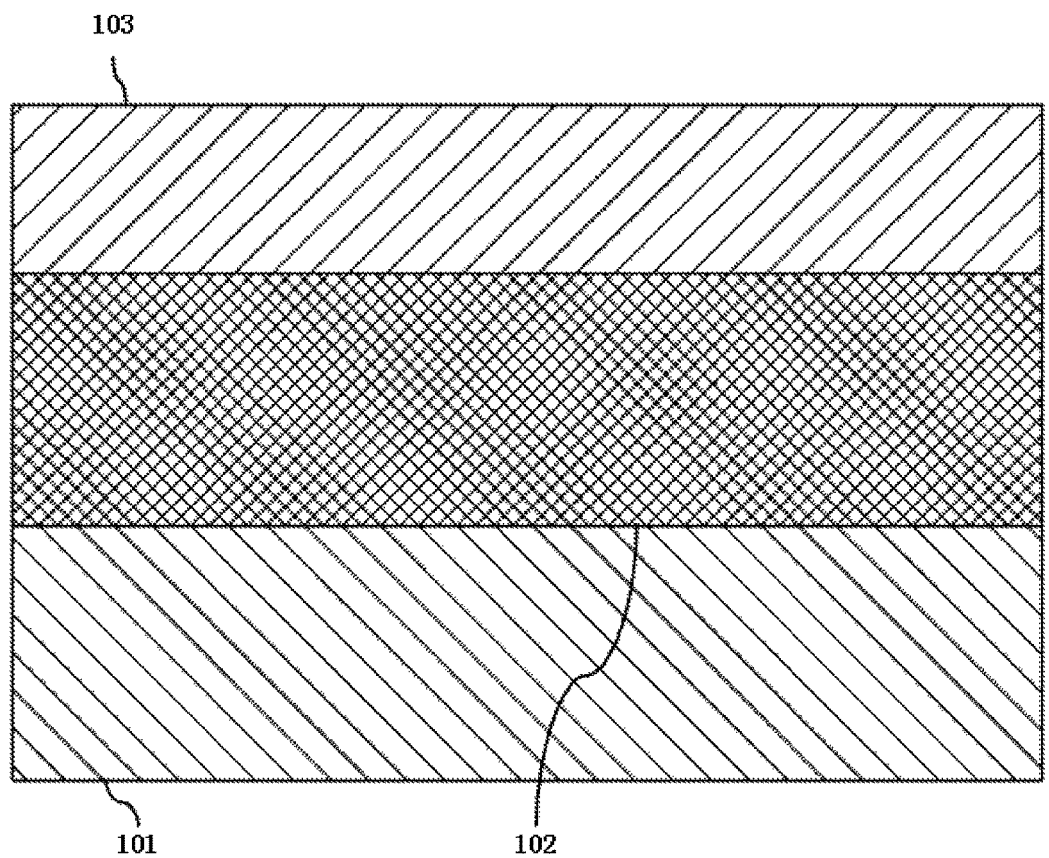
FIG. 1 is a cross-sectional side view of a display panel according to a preferred embodiment of the present invention.
Figure 2:
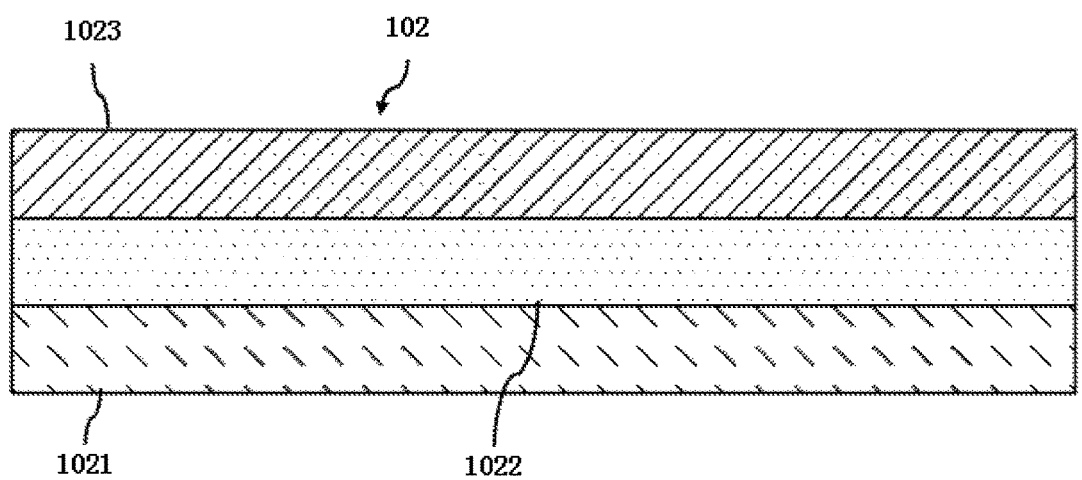
FIG. 2 is a cross-sectional side view of the touch-sensing layer shown in FIG. 1.
Figure 3:
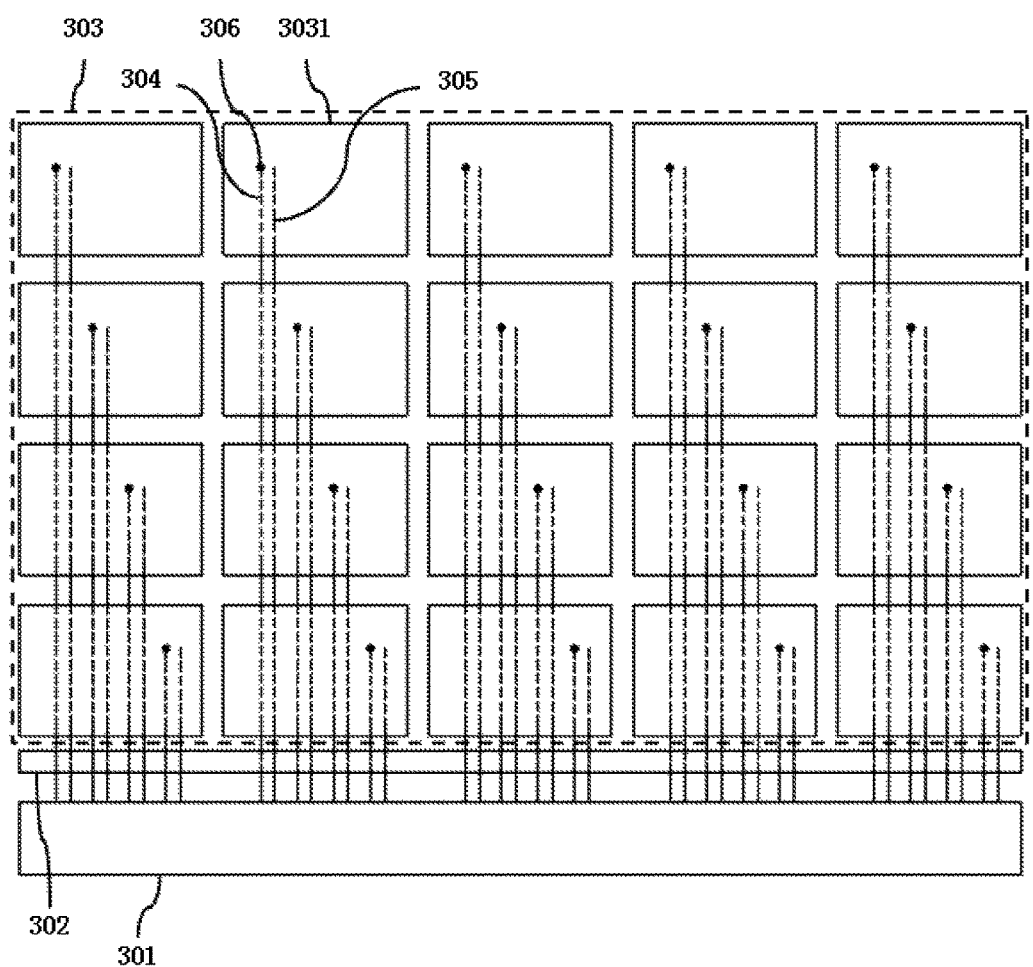
FIG. 3 is a schematic diagram showing a first embodiment of the present invention.
Figure 5:
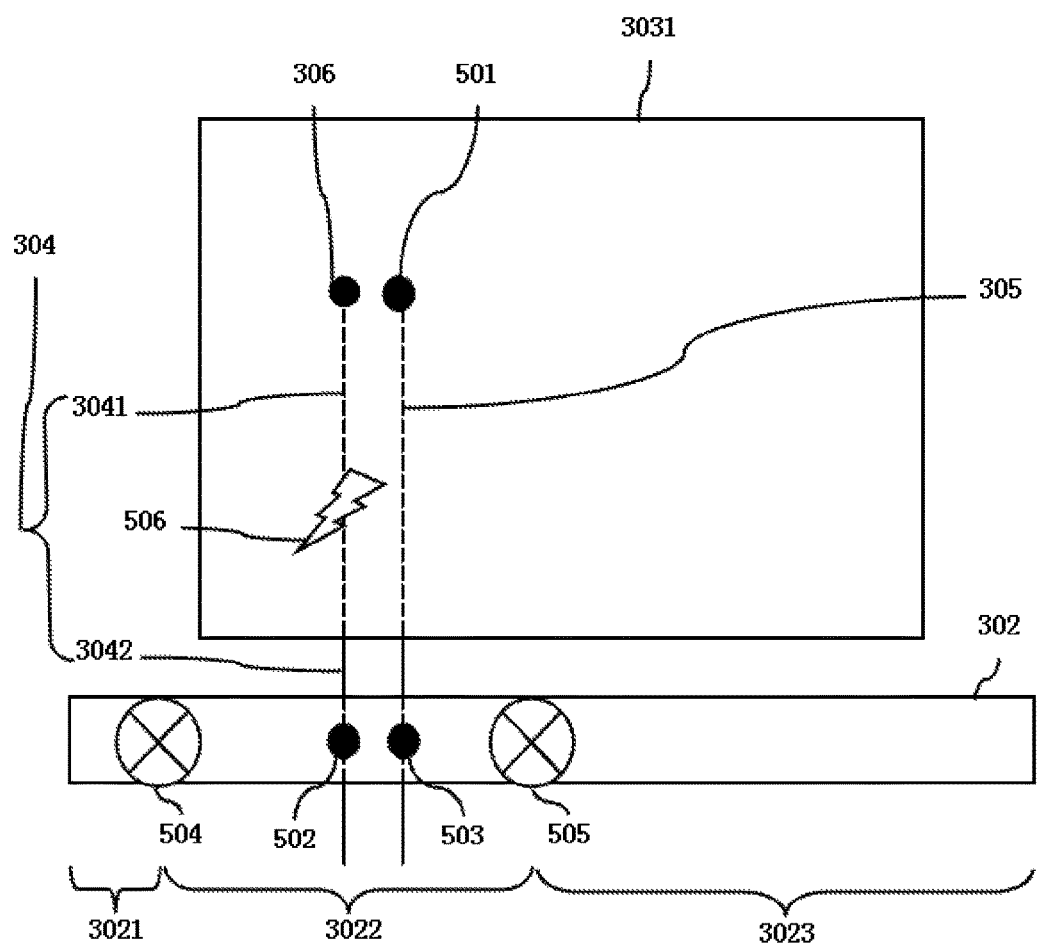
FIG. 5 is a schematic diagram showing applying a method of repairing a display panel according to a preferred embodiment of the present invention.

With reference to FIGS. 1, 2, 3 and 5, FIG. 1 is a cross-sectional side view of a display panel according to a preferred embodiment of the present invention; FIG. 2 is a cross-sectional side view of the touch-sensing layer shown in FIG. 1; FIG. 3 is a schematic diagram showing a first embodiment of the present invention; and FIG. 5 is a schematic diagram showing applying a method of repairing a display panel according to a preferred embodiment of the present invention.

The display panel of the present invention mainly includes a pixel array substrate, a signal processor 301 and a touch-sensing layer 102. The display panel may be a TFT-LCD (Thin-Film Transistor Liquid Crystal Display) panel or an OLED (Organic Light-Emitting Diode) panel or the like.

The touch-sensing layer 102 is mounted in the pixel array substrate. Under a condition where the display panel is a thin-film transistor liquid crystal display panel, the pixel array substrate is a thin-film transistor array substrate, and the display panel further includes a color filter substrate and a liquid crystal layer, wherein the thin-film transistor array substrate may have a pixel electrode layer 103 and an wire array layer 101. The touch-sensing layer 102 is preferably mounted between the pixel electrode layer 103 and the wire array layer 101, wherein the wire array layer 101 may includes a substrate, a plurality of scanning lines, a plurality of TFT (Thin Film Transistor) switches and a plurality of data lines.

The touch-sensing layer 102 and the signal processor 301 are connected. The touch-sensing layer 102 includes a sensing-electrode layer 1023, an insulated layer 1022 and a lead layer 1021, wherein the lead layer 1021 is mounted upon the wire array layer 101, and the insulated layer 1022 is mounted on the lead layer 1021, and the sensing-electrode layer 1023 is mounted on the insulated layer 1022.

The sensing-electrode layer 1023 includes a sensing electrode array 303 which includes at least two sensing electrodes 3031 that are arranged in an array manner.

The lead layer 1021 includes a lead-set array. The lead-set array consists of at least two lead sets. Each of the lead sets includes a primary lead 304 and a spare lead 305, wherein the primary lead 304 and the spare lead 305 belonging to the same lead set are electrically insulated from each other. The primary lead 304 is connected with the corresponding sensing electrode 3031 and the signal processor 301. The primary lead 304 is used to receive a touch-sensing signal generated by the corresponding sensing electrode 3031 and then transmit the touch-sensing signal to the signal processor 301. The spare lead 305 is used to replace the primary lead 304 when a disconnection defect 506 occurs in the primary lead 304 so as to receive the touch-sensing signal instead.

In this embodiment, the spare lead 305 is used to establish a connection with the corresponding sensing electrode 3031 and the signal processor 301 when the disconnection defect 506 occurs in the primary lead 304 so as to transmit the touch-sensing signal to the signal processor 301. Specifically, the connection between the spare lead 305 and the corresponding sensing electrode 3031 is established by soldering (see FIG. 5, the first connection point 501); and the connection with the signal processor 301 is also established by soldering. The spare lead 305 preferably is connected to the corresponding sensing electrode 3031 by passing through the insulated layer 1022.

In this embodiment, the sensing electrode array 303 includes at least two sensing-electrode rows. A line along which the sensing-electrode row is arranged is parallel with the scanning lines.

The sensing-electrode layer 1023 further includes at least one repairing wire 302, wherein a line along which the repairing wire 302 is arranged is parallel with the line along which the sensing-electrode row is arranged. In this embodiment, the repairing wire 302 is mounted at one side of the lead-set array.

The primary lead 304 is used to establish a connection with the repairing wire 302 when the disconnection defect 506 occurs in the primary lead 304 (see FIG. 5, the second connection point 502).

The spare lead 305 is used to establish a connection with the repairing wire 302 when the disconnection defect 506 occurs in the primary lead 304 so that the received touch-sensing signal is transmitted to the signal processor 301 via the spare lead 305, the repairing wire 302 and the primary lead 304.

As shown in FIG. 5, in this embodiment, the primary lead 304 includes a first section 3041 and a second section 3042, wherein the first section 3041 is connected to the corresponding sensing electrode 3031 via a through hole 306; and the second section 3042 is connected to the signal processor 301.

The repairing wire 302 may includes a third section 3021, a fourth section 3022 and a fifth section 3023. The repairing wire 302 is further used to break a connection between the third section 3021 and the fourth section 3022 (see FIG. 5, the first broken point 504) and a connection between the fourth section 3022 and the fifth section 3023 (see FIG. 5, the second broken point 505) when the disconnection defect 506 occurs in the first section 3041 of the primary lead 304.

The primary lead 304 is further used to break the connection between the first section 3041 and the second section 3042 when the disconnection defect 506 occurs in the first section 3041.

The second section 3042 of the primary lead 304 is further used to establish a connection with the fourth section 3022 of the repairing wire 302 when the disconnection defect 506 occurs in the first section 3041 of the primary lead 304 (see FIG. 5, the second connection point 502).

The spare lead 305 is further used to establish a connection with the corresponding sensing electrode 3031 and the fourth section 3022 of the repairing wire 302 when the disconnection defect 506 occurs in the first section 3041 of the primary lead 304 (see FIG. 5, the first connection point 501 and the third connection point 503).

In this embodiment, the connection between the first section 3041 and the second section 3042 of the primary lead 304 is broken by laser cutting; the connection between the third section 3021 and the fourth section 3022 is broken by laser cutting; the connection between the fourth section 3022 and the fifth section 3023 is broken by laser cutting; the connection between the spare lead 305 and the corresponding sensing electrode 3031 is established by soldering; the connection between the spare lead 305 and the fourth section 3022 is established by soldering; and the connection between the second section 3042 of the primary lead 304 and the fourth section 3022 of the repairing wire 302 is established by soldering.

With the foregoing technical solutions, when the disconnection defect 506 occurs in the primary lead 304, the display panel can be repaired by replacing the primary lead 304 with the spare lead 305 so as to eliminate the disconnection defect 506, thereby lowering the defect rate of the display panel.

Figure 4:
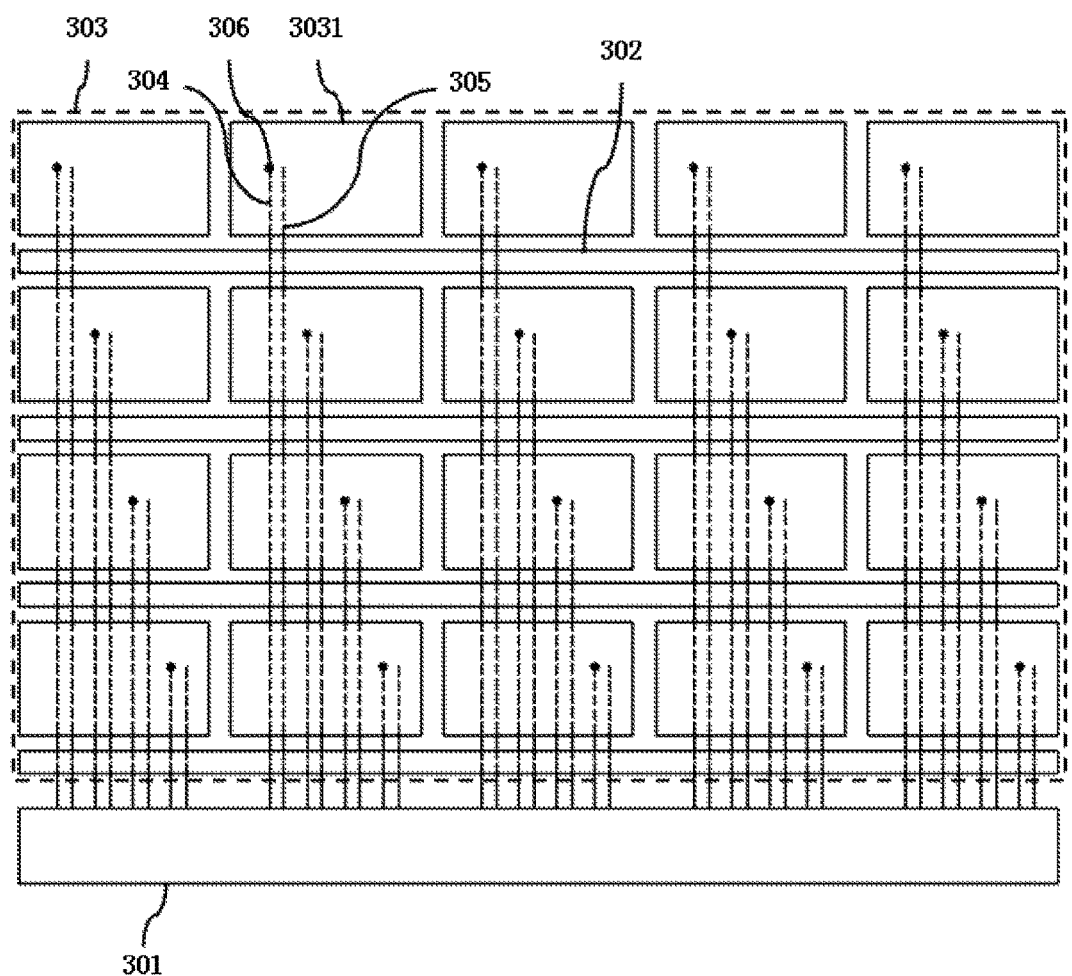
FIG. 4 is a schematic diagram showing a second embodiment of the present invention.

With reference to FIG. 4, FIG. 4 is a schematic diagram showing a second embodiment of the present invention. The second embodiment in FIG. 4 is similar to the first embodiment, but the difference is that the repairing wire 302 is mounted on a position corresponding to a gap between two adjacent sensing-electrode rows. Such an arrangement will be advantageous to enhance flexibility of disconnection repairing for the display panel.

Figure 6:
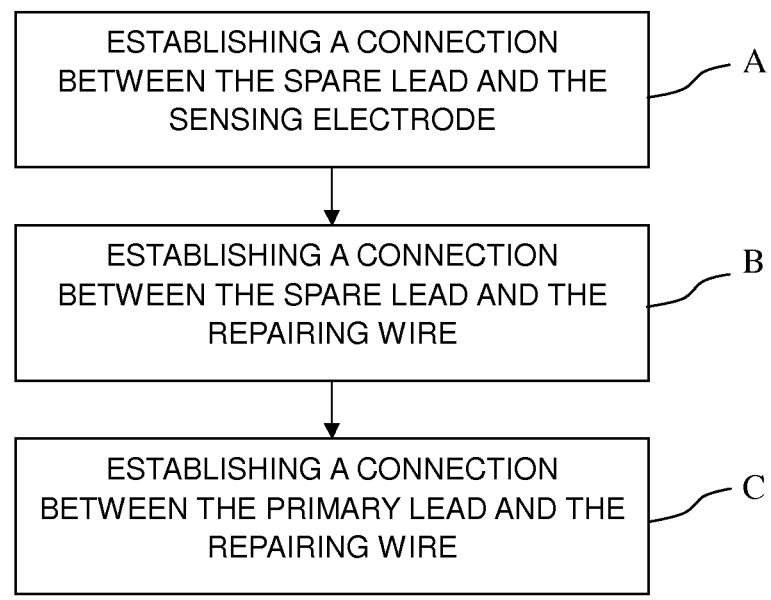
FIG. 6 is a flow chart of the process of a method of repairing the display panel according to a first embodiment of the present invention.

With reference to FIG. 6, FIG. 6 is a flow chart of the process of a method of repairing the display panel according to a first embodiment of the present invention. In the first embodiment, the method of repairing the display panel may include the following steps:

A. establishing a connection between the spare lead 305 and the sensing electrode 3031;

B. establishing a connection between the spare lead 305 and the repairing wire 302;

C. establishing a connection between the primary lead 304 and the repairing wire 302.

Figure 7:
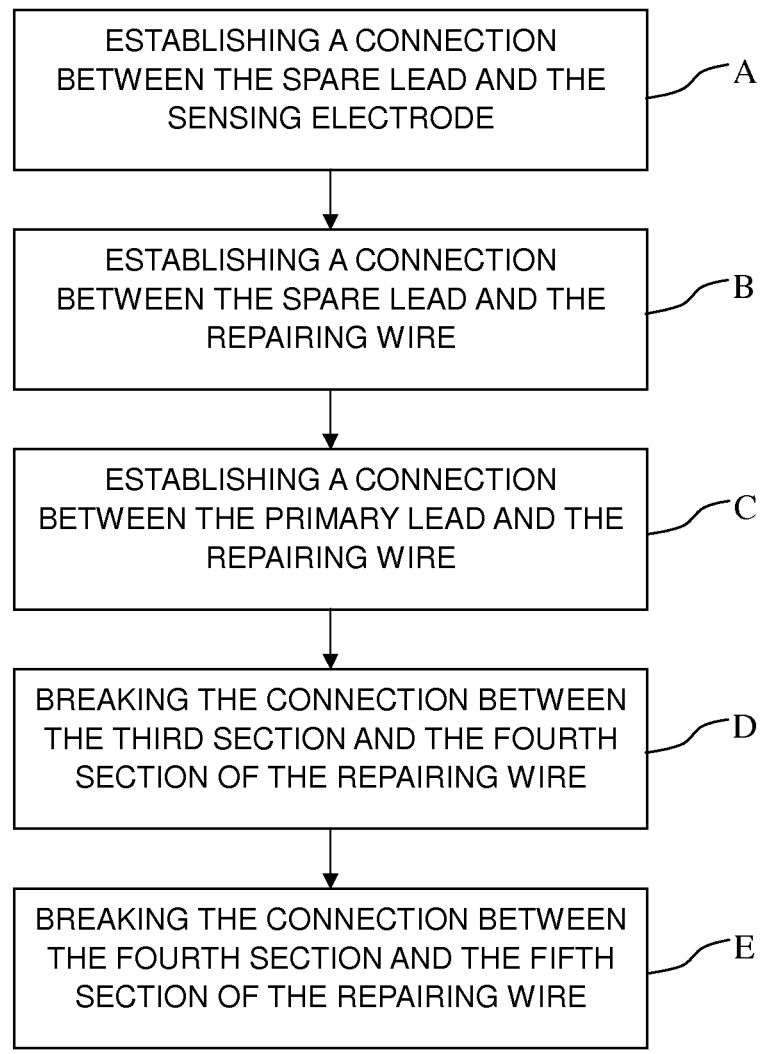
FIG. 7 is a flow chart of the process of a method of repairing the display panel according to a second embodiment of the present invention.

With further reference to FIG. 7, FIG. 7 is a flow chart of the process of a method of repairing the display panel according to a second embodiment of the present invention.

The second embodiment is similar to the first embodiment, but the difference is that the method in the second embodiment further includes the following steps:

D. breaking the connection between the third section 3021 of the repairing wire 302 and the fourth section 3022 of the repairing wire 302;

E. breaking the connection between the fourth section 3022 of the repairing wire 302 and the fifth section 3023 of the repairing wire 302.

F. breaking the connection between the first section 3041 of the primary lead 304 and the second section 3042 of the primary lead 304.

In the foregoing technical solution, the steps A, B, C, D, E and F do not have to be executed in order. That is, the steps can be executed in any order.

In this embodiment, the step A further includes a step of:

a1. connecting the spare lead 305 and the corresponding sensing electrode 3031 by soldering.

The step B further includes a step of:

b1. connecting the spare lead 305 and the fourth section 3022 of the repairing wire 302 by soldering.

The step C further includes a step of:

c1. connecting the second section 3042 of the primary lead 304 and the fourth section 3022 of the repairing wire 302 by soldering.

The step D further includes a step of:

d1. breaking the connection between the third section 3021 and the fourth section 3022 of the repairing wire 302 by laser cutting.

The step E further includes a step of:

e1. breaking the connection between the fourth section 3022 and the fifth section 3023 of the repairing wire 302 by laser cutting.

The step F further includes a step of:

f1. breaking the connection between the first section 3041 and the second section 3042 of the primary lead 304 by laser cutting.

In the foregoing technical solution, the steps a1, b1, c1, d1, e1 and f1 do not have to be executed in order. That is, the steps can be executed in any order.

With the foregoing technical solutions, when the disconnection defect 506 occurs in the primary lead 304, the display panel can be repaired by replacing the primary lead 304 with the spare lead 305 so as to eliminate the disconnection defect 506, thereby lowering the defect rate of the display panel;

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure which performs the function in the herein illustrated exemplary implementations of the disclosure. In addition, while a particular feature of the disclosure may have been disclosed with respect to only one of several implementations, such features may be combined with one or more other features of the other implementations as may be desired and advantageous for any given or particular application. Furthermore, to the extent that the terms "includes", "having", "has", "with", or variants thereof are used in either the detailed description or the claims, such terms are intended to be inclusive in a manner similar to the term "comprising."

The present invention has been described with preferred embodiments thereof, and it is understood that many changes and modifications to the described embodiment can be carried out without departing from the scope and the spirit of the invention that is intended to be limited only by the appended claims.

What is claimed is:

1. A display panel comprising:
   a pixel array substrate;
   a signal processor;
   a touch-sensing layer mounted in the pixel array substrate and connected with the signal processor, wherein the touch-sensing layer includes:
   a sensing-electrode layer having:
      a sensing electrode array having at least two sensing electrodes which are arranged in an array manner;
      a lead layer having at least two lead sets, each of which includes:
   a primary lead being connected with the corresponding sensing electrode and the signal processor and being used to receive a touch-sensing signal generated by the corresponding sensing electrode and transmit the touch-sensing signal to the signal processor; and
   a spare lead being used to replace the primary lead when a disconnection defect occurs in the primary lead so as to receive the touch-sensing signal instead, and being used to further establish a connection with the corresponding sensing electrode and the signal processor when the disconnection defect occurs in the primary lead so as to transmit the touch-sensing signal to the signal processor; wherein the primary lead and the spare lead belonging to the same lead set are electrically insulated from each other; and
      an insulated layer being mounted on the lead layer, wherein the sensing-electrode layer is mounted on the insulated layer; wherein
   the sensing electrode array includes at least two sensing-electrode rows;
   the sensing-electrode layer further includes at least one repairing wire, wherein a line along which the repairing wire is arranged is parallel with a line along which the sensing-electrode row is arranged;
   the primary lead is used to establish a connection with the repairing wire when the disconnection defect occurs in the primary lead;
   the spare lead is used to establish a connection with the repairing wire when the disconnection defect occurs in the primary lead so that the received touch-sensing signal is transmitted to the signal processor via the spare lead, the repairing wire and the primary lead.

2. The display panel as claimed in claim 1, wherein the primary lead includes a first section and a second section; the first section is connected to the corresponding sensing electrode via a through hole; the second section is connected to the signal processor;
   the repairing wire includes a third section, a fourth section and a fifth section; the repairing wire is further used to break a connection between the third section and the fourth section and a connection between the fourth section and the fifth section when the disconnection defect occurs in the first section of the primary lead;
   the second section of the primary lead is further used to establish a connection with the fourth section of the repairing wire when the disconnection defect occurs in the first section of the primary lead; and the spare lead is further used to establish a connection with the corresponding sensing electrode and the fourth section of the repairing wire when the disconnection defect occurs in the first section of the primary lead.

3. The display panel as claimed in claim 2, wherein the connection between the first section and the second section of the primary lead is broken by laser cutting;

the connection between the third section and the fourth section of the repairing wire is broken by laser cutting;

the connection between the fourth section and the fifth section of the repairing wire is broken by laser cutting;

the connection between the spare lead and the corresponding sensing electrode is established by soldering;

the connection between the spare lead and the fourth section of the repairing wire is established by soldering; and the connection between the second section of the primary lead and the fourth section of the repairing wire is established by soldering.

4. A display panel comprising:

a pixel array substrate;

a signal processor; and a touch-sensing layer mounted in the pixel array substrate and connected with the signal processor, wherein the touch-sensing layer includes:

a sensing-electrode layer having:

a sensing electrode array having at least two sensing electrodes which are arranged in an array manner; and a lead layer having a lead-set array consisting of at least two lead sets, wherein each of the lead sets includes:

a primary lead being connected with the corresponding sensing electrode and the signal processor and being used to receive a touch-sensing signal generated by the corresponding sensing electrode and transmit the touch-sensing signal to the signal processor; and a spare lead being used to replace the primary lead when a disconnection defect occurs in the primary lead so as to receive the touch-sensing signal instead; wherein the sensing electrode array includes at least two sensing-electrode rows;

the sensing-electrode layer further includes at least one repairing wire, wherein a line along which the repairing wire is arranged is parallel with a line along which the sensing-electrode row is arrange;

the primary lead is used to establish a connection with the repairing wire when the disconnection defect occurs in the primary lead;

the spare lead is used to establish a connection with the repairing wire when the disconnection defect occurs in the primary lead so that the received touch-sensing signal is transmitted to the signal processor via the spare lead, the repairing wire and the primary lead.

5. The display panel as claimed in claim 4, wherein the spare lead is used to establish a connection with the corresponding sensing electrode and the signal processor when the disconnection defect occurs in the primary lead so as to transmit the touch-sensing signal to the signal processor.

6. The display panel as claimed in claim 4, wherein the repairing wire is mounted at one side of the lead-set array.

7. The display panel as claimed in claim 4, wherein the primary lead includes a first section and a second section; the first section is connected to the corresponding sensing electrode via a through hole; and the second section is connected to the signal processor;

the repairing wire includes a third section, a fourth section and a fifth section, the repairing wire is further used to break a connection between the third section and the fourth section and a connection between the fourth section and the fifth section when the disconnection defect occurs in the first section of the primary lead;

the second section of the primary lead is further used to establish a connection with the fourth section of the repairing wire when the disconnection defect occurs in the first section of the primary lead; and the spare lead is further used to establish a connection with the corresponding sensing electrode and the fourth section of the repairing wire when the disconnection defect occurs in the first section of the primary lead.

8. The display panel as claimed in claim 7, wherein the connection between the third section and the fourth section of the repairing wire is broken by laser cutting;

the connection between the fourth section and the fifth section of the repairing wire is broken by laser cutting;

the connection between the spare lead and the corresponding sensing electrode is established by soldering;

the connection between the spare lead and the fourth section of the repairing wire is established by soldering; and the connection between the second section of the primary lead and the fourth section of the repairing wire is established by soldering.

9. The display panel as claimed in claim 7, wherein the connection between the first section and the second section of the primary lead is broken by laser cutting.

10. The display panel as claimed in claim 4, wherein the touch-sensing layer further includes an insulated layer being mounted on the lead layer; and the sensing-electrode layer is mounted on the insulated layer.

11. The display panel as claimed in claim 10, wherein the spare lead is connected to the corresponding sensing electrode by passing through the insulated layer.

12. The display panel as claimed in claim 4, wherein the primary lead and the spare lead belonging to the same lead set are electrically insulated from each other.

* * * * *